United States Patent [19]

Gorodissky et al.

[11] Patent Number: 4,972,110

[45] Date of Patent: Nov. 20, 1990

[54] CENTRIFUGE WITH UNBALANCE SENSOR ADJUSTMENT

[75] Inventors: Boris P. Gorodissky; Alexandr I. Sambursky, both of Moscow, U.S.S.R.

[73] Assignee: Moscovskeo Nauchno-Proizvodstvennoe Objedinenie, Moscow, U.S.S.R.

[21] Appl. No.: 380,813

[22] Filed: Jul. 14, 1989

[51] Int. Cl.⁵ ......................... H02K 11/00; H02K 7/04

[52] U.S. Cl. .................................... 310/68 E; 73/660; 384/255; 384/258; 494/10; 494/84

[58] Field of Search ......................... 73/451, 655, 660; 74/573 R; 310/157, 68 E, 268; 403/324, 355, 374, 378; 494/10, 84

[56] References Cited

U.S. PATENT DOCUMENTS

| | | | |
|---|---|---|---|
| 4,171,822 | 10/1979 | Thun | 280/259 |
| 4,339,212 | 7/1982 | Sauber | 403/324 |
| 4,507,110 | 3/1985 | Boeckel | 494/10 |
| 4,700,117 | 10/1987 | Giebeler et al. | 494/10 |

OTHER PUBLICATIONS

Proceedings of the symposium "Laboratory Centrifuges and Ultracentrifuges of Heraeus Christ Co.", Moscow, 1983, pp. 6–9.

*Primary Examiner*—Steven L. Stephan
*Assistant Examiner*—D. L. Rebsch
*Attorney, Agent, or Firm*—Lilling and Lilling

[57] ABSTRACT

The centrifuge has a drive rotating a rotor whose position relative to the vertical axis of the centrifuge is monitored by an unbalance sensor located on the installation plate which is accommodated in a recess of the ring in a plane perpendicular to the vertical axis. The ring is installed on the mounting surface of the drive casing with a provision for being moved and set relative to said surface so that the plane of the ring is constantly parallel with the lower surface of the rotor. The installation plate has a hollow for accommodating the unbalance sensor, the shape of the surface of said hollow being mutually complementary with the shape of the mounting surface of the drive casing and the installation plate is located in said ring with a provision for moving in said plane perpendicular to the vertical axis.

7 Claims, 5 Drawing Sheets

CENTRIFUGE WITH UNBALANCE SENSOR ADJUSTMENT

FIELD OF THE INVENTION

The present invention relates to centrifuges, particularly to the means for fastening the sensor which monitors the unbalance of the centrifuge rotor, and can be utilized in biotechnology, biophysics, biology and other fields.

DESCRIPTION OF THE RELATED ART

As it is commonly known the unbalance of the centrifuge rotor should not exceed a certain limit, since otherwise it may bring about grave consequences, including breakage of the rotor and overall failure of the centrifuge.

This is particularly important in view of the fact that the speed of rotors of modern centrifuges reaches scores of thousands of rpm.

Therefore, each design of the centrifuge incorporates a sensor which cuts off the power supply from the centrifuge drive and, consequently, stops the rotor if its unbalance exceeds the preset limit.

Regardless of the type of sensor, it must have an optimum sensitivity to the unbalance of the rotor which can be achieved by varying the position of the sensor. The design of the device for installing the sensor and adjusting its position should be compact, since the point of location of said sensor in any centrifuge is always limited with regard to area.

Besides, the design of the device for installing the sensor should be sufficiently simple, both from the point of view of fixing it in the adjusted position, and from the point of view of its installation and removal, for example for preventive maintenance.

Widely known in the prior art (GB, A, No. 2146784; U.S. Pat. No., A, 4214179) is the unbalance sensor in the form of an electroconductive ring arranged concentrically with the drive shaft and contacting with the latter at a certain vibration amplitude of the rotor.

One of the disadvantages of this design resides in that, on contact of the drive shaft with the ring, the electric circuit passes through the centrifuge casing. This reduces the operator's safety and, consequently, the reliability of the centrifuge.

Another disadvantage of the known design lies in that it has no provision for adjusting the position of the sensor with a view to its adjustment.

There is another known centrifuge wherein the magnetic field generated by the rotor adapter varies due to changes in the geometry of the clearance between the adapter face and the magnetoresistors of the unbalance sensor (Proceedings of the symposium "Laboratory Centrifuges and Ultracentrifuges of Heraeus Christ Co.", Moscow, 1983, p. 6–9).

A disadvantage of this design lies in that it calls for the use of a special adapter with an insert of a magnetosoft material. Such a design is complicated, impairs the strength characteristics of the adapter, and denies the possibility of changing the position of the sensor for adjusting it.

A further known design of the centrifuge (EP, A, No. 0139290) comprises a drive for revolving the rotor whose speed is monitored by a sensor mounted on the installation plate accommodated in the recess of the ring in a plane square to the vertical axis and the ring is installed on the mounting surface of the drive casing with a provision for moving the sensor to a position of its optimum sensitivity to deviaton of the rotor from the vertical axis of the centrifuge. Such a design can be used for installation on said mounting plate of the unbalance sensor which monitors the position of the centrifuge rotor relative to the vertical axis of said centrifuge.

One of the disadvantages of this design is that it fails to ensure constant orienting of the ring in the plane parallel to the lower surface of the rotor.

This is attributed to the fact that adjustment of the position of the installation plate and, consequently, of the sensor is carried out by two screws. This makes it difficult to orient the plate in the plane parallel to the lower surface of the rotor. This will inevitably result in reduced accuracy of monitoring the unbalance of the rotor.

Another disadvantage of the design consists in that it comprises a large number of fastening elements of both the ring and installation plate.

SUMMARY OF THE INVENTION

In accordance with the above considerations the object of the invention resides in providing a simple design of an adjustable device for installing the unbalance sensor of the centrifuge rotor.

Another object resides in providing the means for simple and accurate adjustment of the position of the rotor unbalance sensor with relation to the lower cylindrical part of the adapter.

A still further object of the invention consists in providing a high reliability of fixing the unbalance sensor in the position selected during adjustments.

These and other objects of the invention are achieved by providing a centrifuge which comprises:

a drive;

a rotor revolved by said drive, which has the lower surface;

a casing of said drive having a mounting surface;

a ring installed on said mounting surface of said casing of said drive and having a recess;

an installation plate installed in said recess of said ring in a plane perpendicular to the vertical axis;

a rotor unbalance sensor installed on said installation plate with a provision for moving relative to said lower surface of said rotor to the position of optimum sensitivity to deviation of the rotor from the vertical axis of the centrifuge;

said ring installed on said mounting surface of the drive casing with a provision for being moved and set with relation to this surface so that the plane of said ring would be constantly parallel to said lower surface of said rotor;

said installation plate having a cavity for accommodating said unbalance sensor, the shape of the surface of said cavity being mutually complementary to the shape of said mounting surface of said drive casing;

said installation plate accommodated in said recess of said ring with a provision for moving in said plane perpendicular to said vertical axis for installing said unbalance sensor to the position of its optimum sensitivity to deviations of the rotor from said vertical axis of the centrifuge.

As a result, a simple design has been developed of the adjusting device for installing the unbalance sensor of the centrifuge rotor.

It is expedient that said movement and adjustment of said ring with relation to the mounting surface of the drive casing be ensured by making a first hole in said casing, the axis of said hole being arranged tangentially to said mounting surface of the drive casing, and that a movable element be installed in said first hole, said movable element having a hollow whose shape is mutually complementary with said mounting surface of the drive casing.

It is no less practicable that the movement of the installation plate in the plane perpendicular to said vertical axis be ensured by making a second hole in the ring in a plane of the installation plate at the side opposite to the hollow, the axis of said second hole being perpendicular to said vertical axis and that a second movable element, connected with the installation plate, be located in said second hole.

This will ensure the requisite accuracy of monitoring the rotor unbalance due to a high reliability of fixing the unbalance sensor in the position selected by adjustment.

It is expedient that the unbalance sensor be made in the form of an optical sensor whose radiator and detector are oriented along the line tangent to the mounting surface of the drive casing.

It is expedient that the second hole be threaded and the second movable element be made in the form of a screw with a locknut and that, at the side of the cavity, the installation plate be flexibly linked with the counteropposed surface of the ring recess.

BRIEF DESCRIPTION OF THE DRAWINGS

Now the invention will be described in detail by way of example with reference to the appended drawings in which.

DESCRIPTION OF THE PREFERRED EMBODIMENTS

Figure 1:
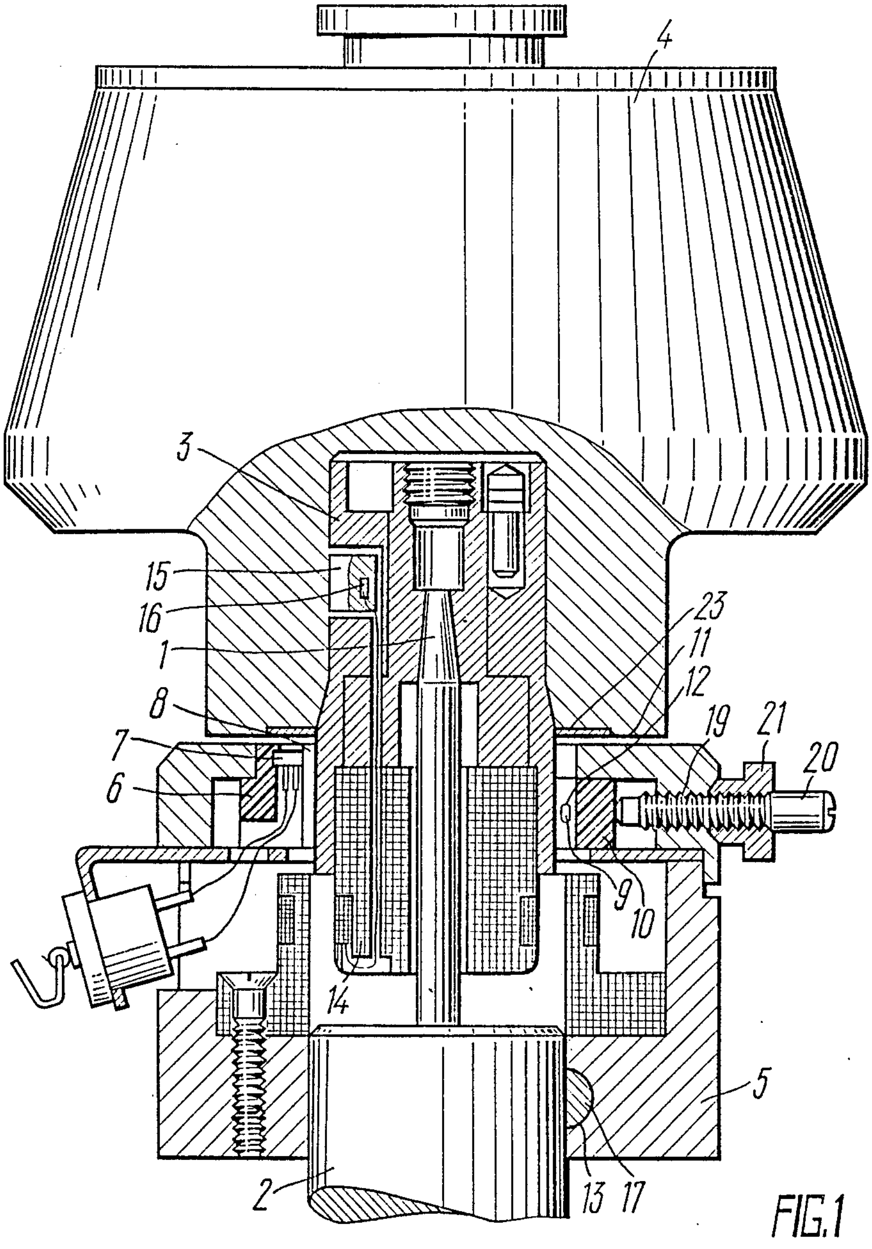
FIG. 1 is a general view of the centrifuge with a partial longitudinal section according to the invention.

In the centrifuge (FIG. 1) the adapter 3 for installing the centrifuge rotor 4 is located on the flexible shaft 1 of the mounting surface of the drive casing. Installed on the mounting surface 2 of the drive casing is a vertically movable ring 5. The ring 5 accommodates an immovable installation plate 6, secured on which is the speed transmitter 7 of the rotor 4 fixed with the aid of a flexible rod 8.

The position of the rotor 4 relative to the vertical axis of the centrifuge is monitored by the unbalance sensor 9 located on the installation plate 10 accommodated in the ring 5 installed on the mounting surface 2 of the drive casing with a provision for the unbalance sensor 9 to be moved to a position of its optimum sensitivity to deviations of the rotor 4 from the vertical axis of the centrifuge.

The ring 5 is installed on the mounting surface 2 of the drive casing with a provision for being moved and set relative to said surface so that the plane of the ring 5 will be constantly parallel to the lower surface 11 of the rotor 4.

The installation plate 10 has a cavity 12 for accommodating the unbalance sensor 9, the shape of the surface of said cavity being mutually complimentary with the shape of the mounting surface 2 of the drive casing.

To move and set the ring 5 relative to the mounting surface 2 of the drive casing, said ring has a first hole 13 whose axis is arranged tangentially to said mounting surface 2 of the drive casing. When using a parametric temperature transmitter, the ring 5 is provided with a coupling coil 14. In this case the adapter 3 has a thermally-dependent capacitor 15 and an inductance coil 16.

Installed in said first hole 13 is the first movable element 17 (retainer) provided with a hollow 18 (FIG. **3*b*) whose shape is mutually complementary with said mounting surface 2 (FIG. 1**) of the drive casing.

For moving the installation plate 10 in the plane perpendicular to said vertical axis, the ring 5 has a second hole 19 in the plane of the installation plate 10 at the side opposite to the hollow 18 (FIG. 2), the axis of said second hole 19 being perpendicular to said vertical axis and accommodating the second movable element 20. Said second hole 19 (FIG. 1) is threaded and the second movable element 20 is made in the form of a screw with a locknut 21, while the installation plate 10 at the side of the cavity 12 is flexibly linked with the counteropposed surface of the recess 24 (FIG. 2) of the ring 5 by means of a spring 22. Installed on the lower surface 11 (FIG. 1) of the rotor 4 is a disc 23 intended to monitor the rotation speed.

Figure 2:
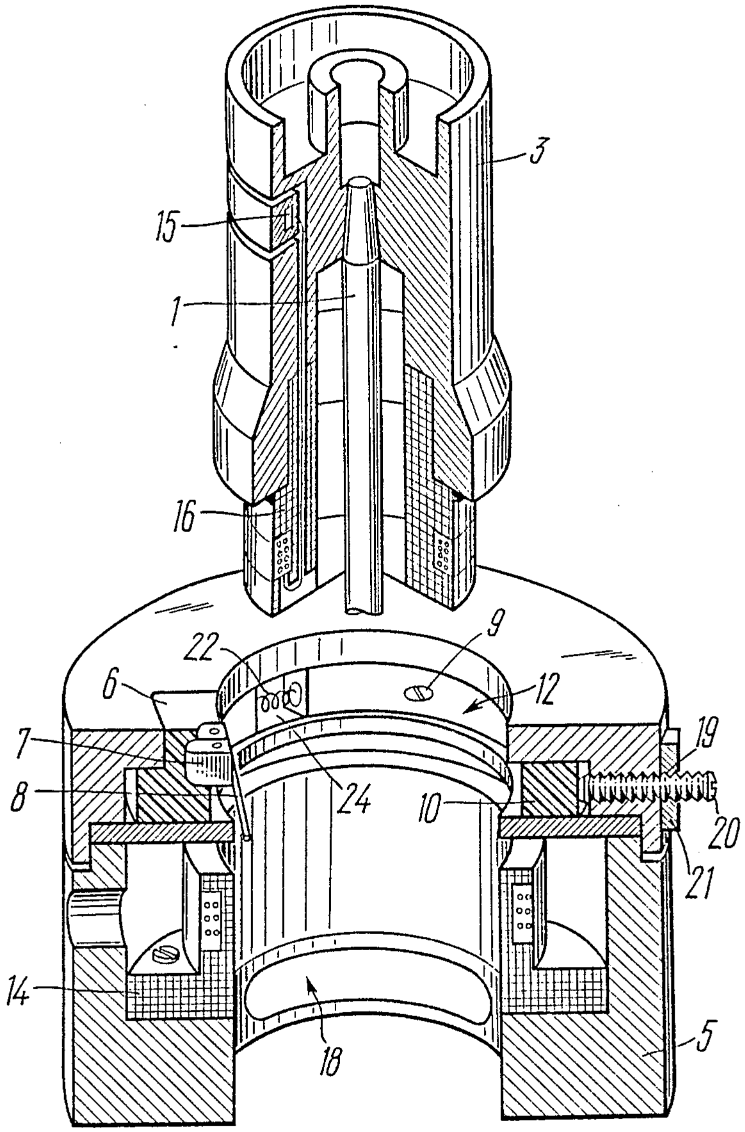
FIG. 2 is an axonometric view of the centrifuge, longitudinal section, partly cut out along the adapter, according to the invention.

Ref. Nos. in FIG. 2 are the same as in FIG. 1 but, to ensure better understanding of the essence of the invention, the figure shows a section through the adapter 3, the sector of said adapter accommodating said capacitor 15 and inductance coil 16. The installation plates 6 and 10 are installed in the recess 24 of the ring 5, the plate 10 being installed with a provision for moving in a transverse plane during adjustment, overcoming the resistance of the spring 22.

Shown in FIG. **3*a* is the disc 23 of the rotor, provided with marks 25**.

FIG. **3*b* is a top view of the installation plates 6 and 10 with sensors 7 and 9**, respectively.

Figure 4:
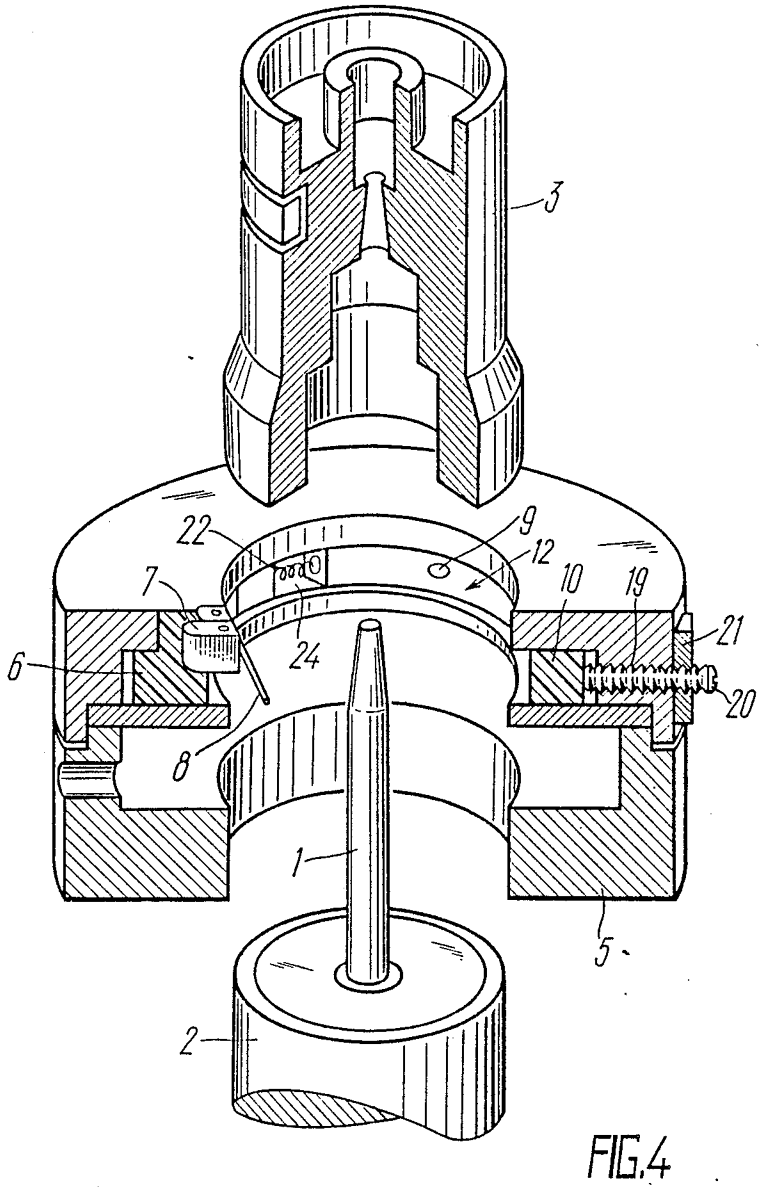
FIG. 4 shows a part of the centrifuge taken off the mounting surface of the drive casing, an axonometric view with a longitudinal cutout illustrating the arrangement of the elements according to the invention.

The unbalance sensor 9 is constituted by an optical sensor whose radiator or light source **9*a* and detector or receiver 9*b* are oriented along the line tangent to the mounting surface 2 (FIG. 4**) of the drive casing.

In a concrete embodiment of the invention the installation plate 10 is flexibly linked at the side of the cavity 12 by the spring 22 with the installation plate 6 secured on the opposite surface of the recess 24 in the ring 5.

Shown in FIG. **3*c* is the arrangement of the first movable element 17 made in the form of a screw with locknut 26 fixing the ring 5** in the selected position.

The Ref. Nos. in FIG. 4 correspond to those in FIG. 1, with the only difference being that the ring 5 is shown removed, and there is no coupling coil 14 (FIG. 1) and inductance coil 16 (for the embodiment with another type of temperature transmitter).

Figure 5A:
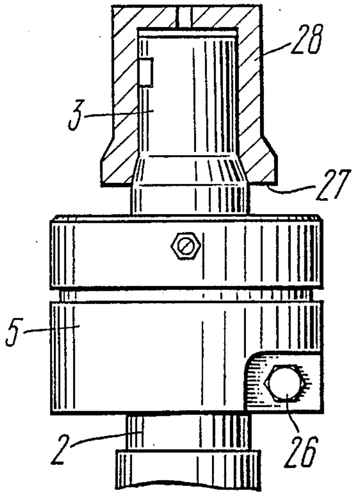
FIG. 5 illustrates the process of adjusting the centrifuge.
Figure 5B:
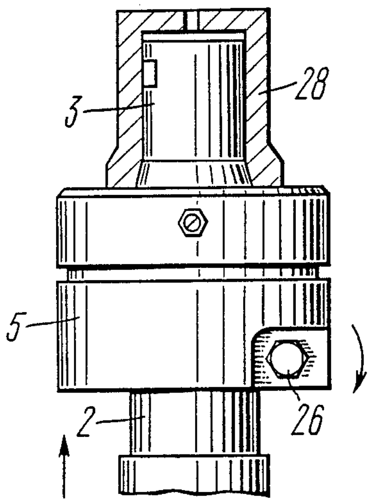
Figure 5C:
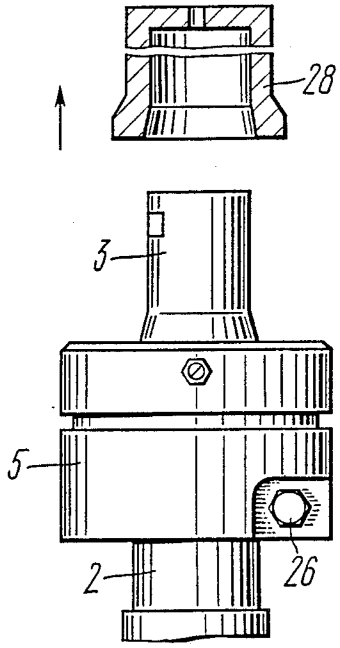

The device is adjusted by shifting the ring 5 over the surface 2 (FIG. **5*a*) of the drive casing all the way to bear against the lower face 27 of the templet 28 which is installed in advance on the adapter 3. The ring 5 is fixed in this position by rotating the nut 26 (FIG. 5*b*). Then the templet 28 is removed (FIG. 5). The position of the sensor 9 (FIG. 2) is selected by rotating the second movable element 20. In this case the installation plate 10 on which the unbalance sensor 9 is mounted moves in a transverse plane of the flexible shaft 1. After selecting the position of the installation plate 10 and, consequently, unbalance sensor 9, second movable element 20 is fixed with locknut 21**.

The centrifuge functions as follows.

Figure 3A:
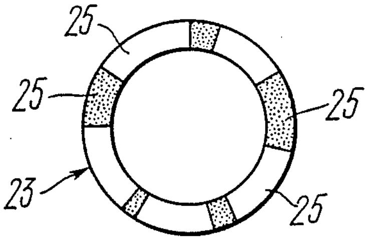
FIG. 3 illustrates installation plates installed in the ring, a movable element and the marked disc used for monitoring the speed of rotation.
Figure 3B:
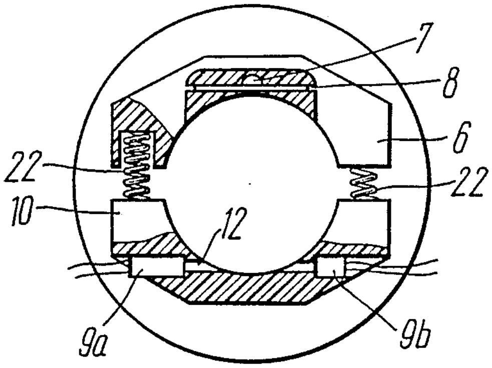
Figure 3C:
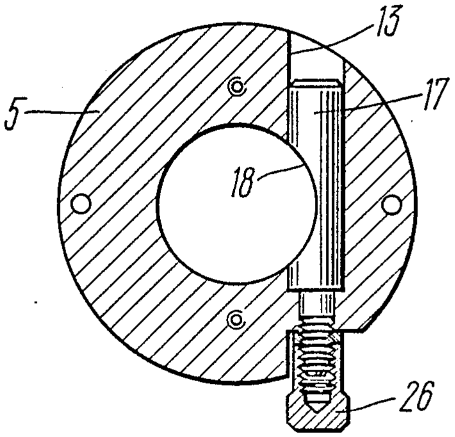

The rotor 4 is installed on the adapter 3 (FIG. 1), the drive (not shown) is switched on and the rotor starts rotating. The speed transmitter 7 of the rotor 4 reads off the marks 25 (FIG. 3*a*) and shapes an electric signal which defines the rotation speed of the rotor 4. The possibility of longitudinal movement of the ring 5 (FIG. 1) relative to the shaft 1 makes it possible to optimize the distance between the transmitter 7 and disc 23, thereby increasing the sensitivity of the transmitter 7 registering the rotor speed, and, consequently, the accuracy of monitoring. The design of the first movable element 17 ensures coaxiality of the ring 5 and shaft 1 which also contributes to a higher accuracy of rotor speed control.

The unbalance sensor 9 oriented tangentially to the surface 2 of the drive casing responds to intervals in the light flux caused by the deviation of the adapter 3 with the shaft 1 due to unbalance of the rotor 4. Such an orientation of the unbalance sensor 9 increases the accuracy of monitoring the unbalance of the rotor. As soon as the preset limit of unbalance is exceeded, the drive is switched off.

Changes in the temperature of the rotor 4 cause variations in the capacity of the capacitor 15 and, consequently, in the impedance of the oscillatory circuit formed by this capacitor 15 and inductance coil 16.

These variations are registered by the coupling coil 14 which ensures the reception of the signal corresponding to the temperature of the rotor 4. If this signal registers a deviation from the preset value of temperature of the rotor 4, the thermostatting system (not shown) responds to this signal.

The above described device is simple in design and ensures the required accuracy of monitoring the speed, temperature and unbalance of the rotor by optimization of settings of the speed transmitter 7 and the unbalance sensor 9. This device can be used in diverse types of centrifuges fitted both with a parametric temperature transmitter and with transmitters of other types. The above-described design provides for substantial savings in adjustment time along with high accuracy.

We claim:

1. A centrifuge comprising:

a drive;

a centrifuge rotor rotated by said drive and having a lower surface;

a casing of said drive having a mounting surface;

a ring installed on said mounting surface of said casing of said drive and having a recess;

an installation plate located in said recess of said ring in a plane perpendicular to a vertical axis of the centrifuge;

a rotor unbalance sensor mounted on said installation plate;

said ring being installed on said mounting surface of the drive casing with a provision for being moved and set relative to this surface so that the plane of said ring is constantly parallel to the lower surface of the rotor;

said installation plate having a cavity for accommodation of said unbalance sensor, said cavity having a surface being mutually complementary in shape with the shape of said mounting surface of the drive casing;

said installation plate being located in said ring with a provision for moving in said plane for setting said unbalance sensor to a position of its optimum sensitivity to a deviation of said rotor from the vertical axis of the centrifuge.

2. A centrifuge according to claim 1 wherein, for moving and setting said ring relative to said mounting surface of the drive casing, said ring has a first hole whose axis is arranged tangetially to said mounting surface of the drive casing, said first hole having a movable element with a hollow whose shape is mutually complementary with said mounting surface of the drive casing.

3. A centrifuge according to claim 2 wherein, for moving said installation plate in a plane perpendicular to said vertical axis, said ring has a second hole in the plane of the installation plate at a side opposite to said hollow, an axis of said second hole being perpendicular to said vertical axis, said second hole accommodating a second movable element connected with said installation plate.

4. A centrifuge according to claim 3 wherein said unbalance sensor is made in the form of an optical sensor having a radiator and a detector oriented along a line tangent to said mounting surface of the drive casing.

5. A centrifuge according to claim 3 wherein said second hole is threaded and said second movable element is made in the form of a screw with a locknut and the installation plate at the side of said hollow is linked flexibly with the counteropposed surface of said recess in said ring.

6. A centrifuge according to claim 2 wherein said unbalance sensor is made in the form of an optical sensor having a radiator and a detector oriented along a line tangent to said mounting surface of the drive casing.

7. A centrifuge according to claim 4 wherein said second hole is threaded and said second movable element is made in the form of a screw with a locknut and the installation plate at the side of said hollow is linked flexibly with the counteropposed surface of said recess in said ring.

* * * * *